United States Patent [19]

Schultz et al.

[11] 3,864,401

[45] Feb. 4, 1975

[54] SUBSTITUTED 2-AMINOMETHYL-4,6-DIHALOPHENOLS

[75] Inventors: Everett M. Schultz, Ambler; Edward J. Cragoe, Jr., Lansdale, both of Pa.

[73] Assignee: Merck & Co., Inc., Rahway, N.J.

[22] Filed: Dec. 23, 1970

[21] Appl. No.: 101,195

[52] U.S. Cl..... 260/570.9, 260/501.17, 260/501.19, 260/553 E, 260/558 R, 260/558 D, 260/559 S, 260/559 R, 260/562 R, 260/566 A, 260/600, 260/612 D, 260/623 R, 260/623 H, 424/316, 424/330
[51] Int. Cl............................................ C07c 87/28
[58] Field of Search .................................. 260/570.9

[56] References Cited
UNITED STATES PATENTS
3,118,941  1/1964  Swett et al. ...................... 260/570.5
3,419,390  12/1968  Cressman .................. 260/570.9 UX OTHER PUBLICATIONS
Wagner et al.. "Organic Synthesis," pages 678–679 (1953).

Primary Examiner—Robert V. Hines
Attorney, Agent, or Firm—Michael C. Sudol, Jr.; J. Jerome Behan

[57] ABSTRACT

Substituted 2-aminomethyl-4,6-dihalophenols and their acid addition salts thereof wherein the phenyl nucleus may be further substituted by from 1 to 2 nuclear substituents which products are useful as diuretics and saluretics. The products may be prepared by one of two methods which comprises: (1) treating a substituted[3,5-dihalo-2-hydroxy N-(substituted benzyl)]carboxamide with an aqueous solution in the presence of an acid or base or (2) subjecting a substituted 2-hydroxy-3,5-dihalobenzaldoxime to reduction.

4 Claims, No Drawings

SUBSTITUTED 2-AMINOMETHYL-4,6-DIHALOPHENOLS

This invention relates to a new class of chemical compounds which can be described generally as substituted 2-aminomethyl-4,6-dihalophenols and to their non-toxic, pharmaceutically acceptable salts thereof. It is also an object of this invention to describe novel methods for the preparation of the substituted 2-aminomethyl-4,6-dihalophenols.

Pharmacological studies indicate that the instant products are effective diuretic and saluretic agents which can be used in the treatment of conditions associated with electrolyte and fluid retention and hypertension. When administered in therapeutic dosages in conventional vehicles, the instant products effectively reduce the amount of sodium and chloride ions in the body, lower dangerous excesses of fluid level to acceptable levels and, in general, alleviate conditions usually associated with edema and hypertension.

The substituted 2-aminomethyl-4,6-dihalophenols of this invention are compounds having the following structural formula:

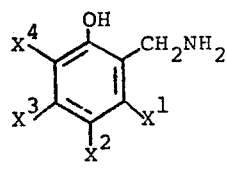

I wherein $X^1$ is alkyl, for example, lower alkyl such as methyl, ethyl, isopropyl, n-butyl and the like or alkoxy, for example, lower alkoxy such as methoxy, ethoxy, n-propoxy, n-butoxy and the like or hydroxy; $X^2$ and $X^4$ are either the same or different halo radicals selected from chloro, bromo, iodo or fluoro and the like and $X^3$ is hydrogen, alkyl, for example, lower alkyl such as methyl, ethyl, isopropyl, n-butyl and the like or alkoxy, for example, lower alkoxy such as methoxy, ethoxy, n-propoxy, n-butoxy and the like. Also included are the non-toxic, pharmaceutically acceptable salts, preferably, the non-toxic, pharmaceutically acceptable acid addition salts derived from a non-toxic, pharmaceutically acceptable acid such as hydrochloric acid, hydrobromic acid, hydriodic acid, sulfuric acid, methanesulfonic acid, isethionic acid and the like; salts may also be prepared from the alkali metal bases such as sodium hydroxide, potassium hydroxide and the like.

A preferred embodiment of this invention relates to the 2-aminomethyl-4,6-dihalo-3,5-disubstituted phenols having the following structural formula:

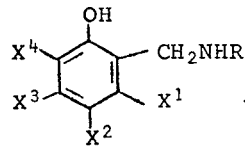

Ia wherein $X^5$ is lower alkyl such as methyl, ethyl and the like or lower alkoxy such as methoxy and the like; $X^7$ is lower alkyl such as methyl, ethyl and the like or lower alkoxy such as methoxy and the like and $X^6$ and $X^8$ are halo such as chloro, bromo, iodo or fluoro and the like and the non-toxic, pharmaceutically acceptable acid addition salts thereof. This class of compounds exhibits particularly good diuretic and saluretic activity and represents a preferred subgroup of compounds within the scope of this invention.

The substituted 2-aminomethyl-4,6-dihalophenols (I) may be prepared by one of two methods which comprises (1) treating a substituted 3,5-dihalo-2-hydroxy-N-(substituted benzyl)carboxamide (II) with an aqueous solution in the presence of a catalyst or (2) subjecting a substituted 2-hydroxy-3,5-dihalobenzaldoxime (III) to reduction.

The first of the above-mentioned processes for preparing the substituted 2-aminomethyl-4,6-dihalophenols (I) of this invention comprises treating a substituted[3,5-dihalo-2-hydroxy-N-(substituted benzyl)]carboxamide (II, infra) with an aqueous solution in the presence of an acid, preferably a mineral acid such as hydrochloric acid, hydrobromic acid, sulfuric acid, hydriodic acid and the like; in addition to the mineral acids, bases may also be employed, for example, the alkali metal bases such as sodium hydroxide, potassium hydroxide and the like. Any solvent which is inert or substantially inert to the reactants may be employed such as ethanol, acetic acid and the like. The reaction may be conducted at a temperature in the range of from about 20° to about 110°C. for a period of time of from about 15 minutes to about 5 hours; however, the reaction is generally conducted at the reflux temperature of the particular solvent employed for a period of time of about 1½ hours. The following equation illustrates this reaction employing a mineral acid, $HR^1$, as the catalyst:

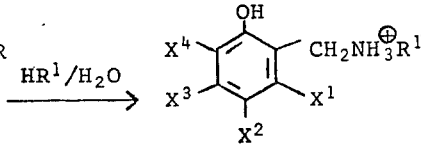

II        Ib        I wherein $X^1$, $X^2$, $X^3$ and $X^4$ are defined above; R is an acyl radical, for example, formyl, haloacetyl such as chloroacetyl and the like, carbamoyl, mononuclear aroyl such as benzoyl and the like, hydroxy substituted mononuclear aroyl such as o-hydroxybenzoyl and the like or trihalomethylcarbonyl such as trichloromethylcarbonyl and the like and $R^{1-}$ is the anion derived from an acid, for example, a mineral acid such as hydrochloric acid, hydrobromic acid, hydriodic acid, sulfuric acid and the like. The product is usually obtained in the form of an acid addition salt and the free amine can be generated by known neutralization methods.

The second method for preparing the substituted 2-aminomethyl-4,6-dihalophenols (I) of this invention comprises subjecting a substituted 2-hydroxy-3,5-dihalobenzaldoximine (III, infra) to reduction, for example, by hydrogenation such as catalytic hydrogenation employing a noble metal such as rhodium, ruthenium and the like, preferably on a carrier such as carbon and the like. The reduction is generally conducted employing as the solvent a lower alkanol such as ethanol, methanol and the like in the presence of a mineral acid such as sulfuric acid and the like. The following equation illustrates this process:

acid such as acetic acid and the like. The following equation illustrates this process:

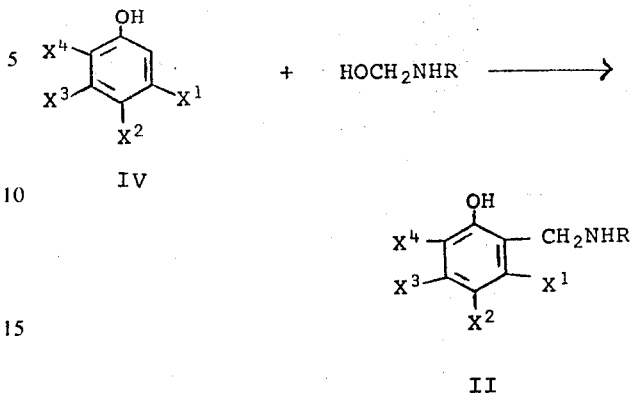

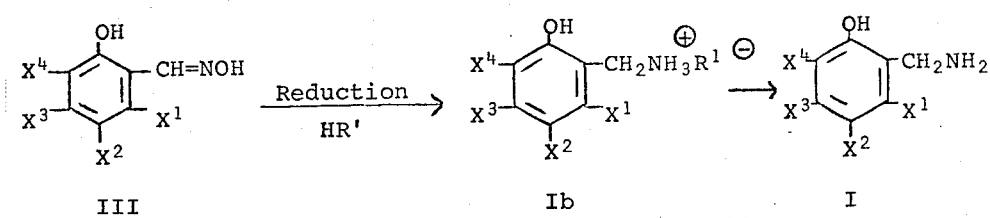

wherein $X^1$, $X^2$, $X^3$, $X^4$ and $R^{1-}$ are defined as above. The product is usually obtained in the form of an acid addition salt and the free amine can be generated by known neutralization methods.

The substituted[3,5-dihalo-2-hydroxy-N-(substituted benzyl)]carboxamides (II, supra) employed as starting materials in the preparation of the substituted 2-aminomethyl-4,6-dihalophenols (I) are prepared by treating an appropriately substituted 2,4-dihalophenol(IV, infra) with an N-hydroxymethylcarboxamide, for example, N-hydroxymethylurea, 2-halo-N-hydroxymethylacetamide such as 2-chloro-N-hydroxymethyl acetamide and the like, N-hydroxymethyl mononuclear arylcarboxamide such as N-hydroxymethylbenzamide and the like, N-hydroxymethylsalicylamide and the like or N-hydroxymethyl trihaloacetamide such as N-hydroxymethyltrichloroacetamide and the like in the presence of a strong mineral acid such as hydrochloric acid, sulfuric acid and the like. The reaction may be conducted employing as the solvent an excess of the mineral acid employed or with a solvent which is inert or substantially inert to the reactants employed, for example, a lower alkanol such as ethanol and the like or a lower alkanoic wherein $X^1$, $X^2$, $X^3$, $X^4$ and R are as defined above.

The substituted 2-hydroxy-3,5-dihalobenzaldoximes (III, supra) employed in the second of the above-mentioned processes may be prepared by treating substituted 2-hydroxy-3,5-dihalobenzaldehyde (V, infra) with a hydroxylamine hydrohalide such as hydroxylamine hydrochloride and the like in the presence of a base such as sodium acetate and the like. This reaction is generally conducted in a lower alkanol solvent such as ethanol and the like. The reaction is conveniently conducted at the boiling point of the particular solvent employed. The following equation illustrates this process:

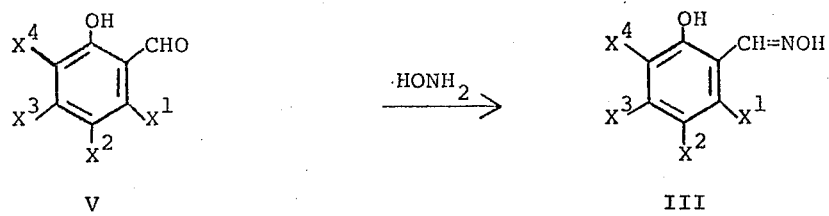

wherein $X^1$, $X^2$, $X^3$ and $X^4$ are as defined above.

The substituted 2,4-dihalophenols (IV) are either known compounds or may be prepared by known methods, for example, by treating either a mono-halo substituted phenol (VI) or a phenol having no halo substituents (VII), with a halogenating agent such as sulfuryl chloride, chlorine gas, bromine, iodine in the presence of mercuric oxide and the like. Any solvent which is inert or substantially inert to the reactants may be employed such as chloroform, benzene and the like. The following equation illustrates this process:

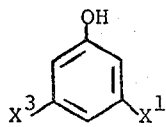

VII

Halogenating Agent →

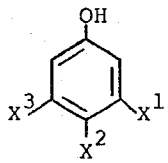

VI

↓ Halogenating Agent

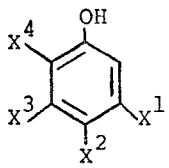

IV wherein $X^1$, $X^2$, $X^3$ and $X^4$ are as defined above.

The substituted 2-hydroxy-3,5-dihalobenzaldehydes (Va) employed in the preparation of the substituted 2-hydroxy-3,5-dihalobenzaldoximes (III) may be prepared by treating an appropriately substituted 2-hydroxybenzaldehyde (VIII) with a halogenating agent such as sulfuryl chloride, chlorine gas, bromine and the like in an inert solvent such as chloroform, benzene and the like. The following equation illustrates the process for inserting two identical halo radicals; however, it should be understood that those 2-hydroxybenzaldehydes already having a halo substituent in either the $X^2$ or $X^4$ position may be similarly treated to obtain 2-hydroxy-3,5-dihalobenzaldehydes wherein the $X^2$ and $X^4$ halo substituents are different.

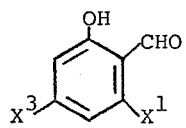

VIII

Halogenating Agent →

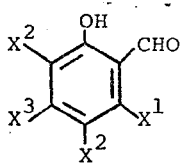

Va wherein $X^1$, $X^2$ and $X^3$ are as defined above.

The examples which follow illustrate the substituted 2-aminomethyl-4,6-dihalophenols (I) of this invention and the methods by which they are prepared. However, the examples are illustrative only and it will be apparent to those having ordinary skill in the art that all of the products embraced by formula I, supra, may also be prepared in an analogous manner by substituting the appropriate starting materials for those set forth in the examples.

EXAMPLE 1

2-Aminomethyl-4,6-dichloro-3-methylphenol Hydrochloride

Step A: 2-Chloro-N-(3,5-dichloro-2-hydroxy-6-methylbenzyl)acetamide

A well-pulverized mixture of 2,4-dichloro-5-methylphenol (8.85 g., 0.05 mole) and 2-chloro-N-hydroxymethylacetamide (6.15 g., 0.05 mole) is added, in portions, with stirring and cooling to keep the internal temperature below 20°C., to concentrated sulfuric acid (50 ml.). The mixture then is stirred at about 25°C. for 20 hours, poured onto ice (about 200 g.) to afford crude 2-chloro-N-(3,5-dichloro-2-hydroxy-6-methylbenzyl)acetamide.

Step B: 2-Aminomethyl-3-methyl-4,6-dichlorophenol Hydrochloride

2-Chloro-N-(3,5-dichloro-2-hydroxy-6-methylbenzyl)acetamide amide is dissolved in absolute ethanol (100 ml.) containing concentrated hydrochloric acid (30 ml.). The mixture is refluxed for 1½ hours, cooled to −20°C. and the precipitate is collected, washed with absolute ethanol and dried at 60°C. The dried solid is recrystallized from a mixture of absolute ethanol and concentrated hydrochloric acid (2:9) to obtain 3.7 g. of 2-aminomethyl-4,6-dichloro-3-methylphenol hydrochloride, m.p. 260°–260.5°C.

Elemental analysis for $C_8H_9Cl_2NO \cdot HCl$:
Calc.: C, 39.62; H, 4.16; N, 5.78;
Found: C, 39.87; H, 4.30; N, 5.76.

EXAMPLE 2

2-Aminomethyl-4,6-dichlororesorcinol Hydrochloride

Step A: 2-Chloro-N-(3,5-dichloro-2,6-dihydroxybenzyl)acetamide

By following substantially the procedure described in Example 1, Step A, and by substituting 4,6-dichlororesorcinol (8.95 g., 0.05 mole) for the 2,4-dichloro-5-methylphenol described therein, there is obtained crude 2-chloro-N-(3,5-dichloro-2,6-dihydroxybenzyl)acetamide (12.65 g.), m.p. 170°–178°C. Recrystallization from a mixture of ethanol and water (1:1 or 2:1) affords substantially pure 2-chloro-N-(3,5- dichloro-2,6-dihydroxybenzyl)acetamide, m.p. 190.5°–191°C.

Elemental analysis for $C_9H_8Cl_3NO_3$:
Calc.: C, 37.99; H, 2.83; N, 4.92;
Found: C, 38.34; H, 3.11; N, 4.89.

Step B: 2-Aminomethyl-4,6-dichlororesorcinol Hydrochloride

2-Chloro-N-(3,5-dichloro-2,6-dihydroxybenzyl)acetamide (4.26 g., 0.015 mole) is refluxed in a mixture of ethanol (40 ml.) and concentrated hydrochloric acid (20 ml.) for 1½ hours to obtain 21.2 g. of 2-aminomethyl-4,6-dichlororesorcinol hydrochloride, m.p. 250°–251°C.

Elemental analysis for $C_7H_7Cl_2NO_2$:
Calc.: C, 34.39; H, 3.30; N, 5.73;
Found: C, 34.63; H, 3.52; N, 5.82.

EXAMPLE 3

2-Aminomethyl-4,6-dichloro-3,5-diethylphenol Hydrochloride

Step A: 4-Chloro-3,5-diethylphenol 3,5-Diethylphenol (16.0 g., 0.106 mole) is dissolved in chloroform (100 ml.). To this is added at 20°C., with stirring, freshly distilled sulfuryl chloride (14.8 g., 0.1 mole) in chloroform (20 ml.). The mixture is stirred for 20 hours at 20°C. The solvent is evaporated and the residual oil is kept at −25°C. for 20 hours, whereupon it solidifies. The solid is recrystallized from ligroin to obtain 11.2 g. of 4-chloro-3,5-diethylphenol, m.p. 58°–62°C. For analysis, a small sample is recrystallized from hexane to obtain substantially pure 4-chloro-3,5-diethylphenol, m.p. 63°–64°C.

Elemental analysis for $C_{10}H_{13}ClO$:
Calc.: C, 65.04; H, 7.09;
Found: C, 64.96; H, 7.07.

Step B: 4,6-Dichloro-3,5-diethylphenol

4-Chloro-3,5-diethylphenol (10.64 g., 0.058 mole) is dissolved in chloroform (30 ml.). The solution is heated to boiling and freshly distilled sulfuryl chloride (8.1 g., 0.06 mole) in chloroform (10 ml.) is added dropwise with stirring. The mixture is refluxed for 3 hours and then additional sulfuryl chloride (4.58 g., 0.034 mole) is added. Refluxing is continued for 2.5 hours and then the mixture is kept at 20°C. for 20 hours. Evaporation of the chloroform leaves a solid which is recrystallized from ligroin to obtain 6.28 g. of 4,6-dichloro-3,5-diethylphenol, m.p. 46°–48°C.

Step C: 2-Aminomethyl-4,6-dichloro-3,5-diethylphenol Hydrochloride

A mixture of 4,6-dichloro-3,5-diethylphenol (2.77 g., 0.0125 mole) and 2-chloro-N-hydroxymethylacetamide is added with stirring over a 10-minute period to a solution of concentrated sulfuric acid (10 ml.) in acetic acid (20 ml.). The internal temperature is kept below 20°C. by external cooling. The mixture is stirred at 20°C. for 18½ hours and then poured into ice water. The aqueous layer is decanted from the white gum that separates. The gum is washed by decantation and dissolved in ethanol (30 ml.). concentrated hydrochloric acid (20 ml.) is added and the mixture is refluxed for 2 hours. The reaction mixture is evaporated to dryness at reduced pressure. The residual solid is recrystallized from a mixture of ethanol and concentrated hydrochloric acid (2:1) and then from isopropanol to obtain 0.6 g. of 2-aminomethyl-4,6-dichloro-3,5-diethylphenol hydrochloride, m.p. 200°–201°C.

Elemental analysis for $C_{11}H_{15}Cl_2NO \cdot HCl$:
Calc.: C, 46.42; H, 5.67; N, 4.92;
Found: C, 46.16; H, 5.87; N, 4.80.

By following substantially the procedure described in Example 3, Step A, and by substituting for the 3,5-diethylphenol described therein an equimolar quantity of 3,5-diisopropylphenol, 3,5-di-n-butylphenol, 3,5-di-n-propoxyphenol and 3,5-di-n-butoxyphenol, there is obtained, respectively, 4-chloro-3,5-diisopropylphenol, 4-chloro-3,5-di-n-butylphenol, 4-chloro-3,5-di-n-propoxyphenol and 4-chloro-3,5-di-n-butoxyphenol which, when substituted for the 4-chloro-3,5-diethylphenol of Example 3, Step B, and following substantially the procedure described therein, there is obtained, respectively, 4,6-dichloro-3,5-diisopropylphenol, 4,6-dichloro-3,5-di-n-butylphenol, 4,6-dichloro-3,5-di-n-propoxyphenol and 4,6-dichloro-3,5-di-n-butoxyphenol which compounds when substituted for the 4,6-dichloro-3,5-diethylphenol of Example 3, Step C, and following substantially the procedure described therein affords, respectively, 2-aminomethyl-4,6-dichloro-3,5-diisopropylphenol hydrochloride, 2-aminomethyl-4,6-dichloro-3,5-di-n-butylphenol hydrochloride, 2-aminomethyl-4,6-dichloro-3,5-di-n-propoxyphenol hydrochloride and 2-aminomethyl-4,6-dichloro-3,5-di-n-butoxyphenol hydrochloride.

EXAMPLE 4

2-Aminomethyl-4,6-dibromo-3,5-dimethylphenol Hydrochloride

2-Chloro-N-hydroxymethylacetamide (2.5 g., 0.02 mole) is added to a cooled solution of 2,4-dibromo-3,5-dimethylphenol in a mixture of acetic acid (32 ml.) and concentrated sulfuric acid (8 ml.). The mixture is kept at 20°C. for a further 45 minutes and then is poured into ice water. The white solid that separates is washed with water and air-dried. The crude 2-chloro-N-(3,5-dibromo-2-hydroxy-4,6-dimethylbenzyl)acetamide is added to a solution of ethanol (75 ml.) and concentrated hydrochloric acid (10 ml.). The mixture is refluxed for 2 hours. The solid that separates on cooling is recrystallized from a mixture of ethanol and concentrated hydrochloric acid (about 10:1) to obtain 2.1 g. of 2-aminomethyl-4,6-dibromo-3,5-dimethylphenol hydrochloride, m.p. >310°C.

Elemental analysis for $C_9H_{11}Br_2NO \cdot HCl$:
Calc.: C, 31.29; H, 3.50; N, 4.05;
Found: C, 31.19; H, 3.58; N, 4.02.

EXAMPLE 5

2-Aminomethyl-4,6-dichloro-3,5-dimethylphenol Hydrochloride

By following substantially the procedure described in Example 4 and by substituting 2,4-dichloro-3,5-dimethylphenol (5.7 g., 0.03 mole) for the 2,4-dibromo-3,5-dimethylphenol described therein, there is obtained, after recrystallization from a mixture of 90% ethanol and concentrated hydrochloric acid (30:1), 3.8 g. of 2-aminomethyl-4,6-dichloro-3,5-dimethylphenol hydrochloride, m.p. 267°–271°C.

Elemental analysis for $C_9H_{11}Cl_2NO \cdot HCl$:
Calc.: C, 42.13; H, 4.71; N, 5.46;
Found: C, 42.48; H, 4.79; N, 5.47.

EXAMPLE 6

2-Aminomethyl-4,6-dichloro-3-ethyl-5-methylphenol Hydrochloride

By following substantially the procedure as described in Example 4 and by substituting 2,4-dichloro-5-ethyl-3-methylphenol (4.1 g., 0.02 mole) for the 2,4-dibromo-3,5-dimethylphenol described therein, there is obtained, after recrystallization from a mixture of ethanol and concentrated hydrochloric acid (1:1), 3.75 g. of 2-aminomethyl-4,6-dichloro-3-ethyl-5-methylphenol hydrochloride, m.p. 233°–234°C. (dec.).

Elemental analysis for $C_{10}H_{13}Cl_2NO.HCl$:
Calc.: C, 44.39; H, 5.22; N, 5.18;
Found: C, 44.50; H, 5.15; N, 5.23.

EXAMPLE 7

2-Aminomethyl-6-bromo-4-chloro-3,5-dimethylphenol Hydrochloride

By following substantially the procedure of Example 4 and by substituting an equimolar quantity of 2-bromo-4-chloro-3,5-dimethylphenol for the 2,4-dibromo-3,5-dimethylphenol described therein, there is obtained, after recrystallization from a mixture of ethanol and concentrated hydrochloric acid (25:1), 3.1 g. of 2-aminomethyl-6-bromo-4-chloro-3,5-dimethylphenol hydrochloride, m.p. 253°–255°C.

Elemental analysis for $C_9H_{11}BrClNO.HCl$:
Calc.: C, 35.91; H, 4.02; N, 4.65;
Found: C, 35.91; H, 4.08; N, 4.71.

EXAMPLE 8

2-Aminomethyl-4,6-dichloro-3,5-dimethoxyphenol Hydrochloride

Step A: 2,4-Dichloro-3,5-dimethoxyphenol

4-Chloro-3,5-dimethoxyphenol (7.04 g., 0.037 mole) is dissolved in chloroform (100 ml.) and sulfuryl chloride (2.43 g., 0.018 mole) is added portionwise with stirring at room temperature. The reaction mixture is warmed to 70°C. and stirring and heating are continued for 17 hours. The chloroform is evaporated to afford a yellow residue which solidifies upon stirring and cooling. Recrystallization from ligroin affords 5.49 g. of 2,4-dichloro-3,5-dimethoxyphenol, m.p. 93°–97°C.

Elemental analysis for $C_8H_8Cl_2O_3$:
Calc.: C, 43.08; H, 3.61;
Found: C, 43.15; H, 3.62.

Step B: 2-Aminomethyl-4,6-dichloro-3,5-dimethoxyphenol Hydrochloride

A well-pulverized mixture of 2,4-dichloro-3,5-dimethoxyphenol (5.49 g., 0.025 mole) and 2-chloro-N-hydroxymethylacetamide (3.04 g., 0.025 mole) is added slowly at 20°C. to a stirred mixture of acetic acid (45 ml.) and concentrated sulfuric acid (5 ml.) ove a 20-minute period. The mixture is stirred for 2 hours and then poured into ice and water. The white gum that separates is stirred with fresh ice water and soon solidifies. The crude 2-chloro-N-(3,5-dichloro-2-hydroxy-4,6-dimethoxybenzyl)acetamide is recrystallized once from a mixture of ethanol and water (3:4) and then dissolved in a mixture of ethanol (50 ml.) and concentrated hydrochloric acid (15 ml.). The solution is refluxed for 2½ hours and is then evaporated to dryness. The residue is recrystallized from a mixture of ethanol and concentrated hydrochloric acid (4:1) and then from a mixture of ethanol and ether to obtain 1.35 g. of 2-aminomethyl-4,6-dichloro-3,5-dimethoxyphenol hydrochloride, m.p. 172°–173°C.

Elemental analysis for $C_9H_{11}Cl_2NO_3.HCl$:
Calc.: C, 37.47; H, 4.19; Cl, 36.86; N, 4.85;
Found: C, 36.65; H, 4.37; Cl, 37.12; N, 4.86.

By following substantially the procedure of Example 8, Step A, and by substituting for the 4-chloro-3,5-dimethoxyphenol described therein an equimolar quantity of 4-fluoro-3-methylphenol; there is obtained 2-chloro-4-fluoro-5-methylphenol which when substituted for the 2,4-dichloro-3,5-dimethoxyphenol of Example 8, Step B, and following substantially the procedure described therein, affords 2-aminomethyl-6-chloro-4-fluoro-5-methylphenol hydrochloride.

EXAMPLE 9

2-Aminomethyl-4,6-dichloro-5-ethyl-3-methylphenol Hydrochloride 2,4-Dichloro-3-ethyl-5-methylphenol (4.1 g., 0.02 mole) in a mixture of acetic acid (20 ml.) and concentrated sulfuric acid (10 ml.) is treated with 2-chloro-N-hydroxymethylacetamide (2.47 g., 0.02 mole). After 4 hours the mixture is poured into ice water (400 ml.). The solid that separates is washed with water, dried at 60°C., and dissolved in a mixture of ethanol (20 ml.) and concentrated hydrochloric acid (10 ml.). After refluxing for 90 minutes, the mixture is cooled. The colorless needles that separate are recrystallized from a mixture of ethanol and concentrated hydrochloric acid (4:1) to afford 2.6 g. of 2-aminomethyl-4,6-dichloro-5-ethyl-3-methylphenol hydrochloride, m.p. 267°–268°C.

Elemental analysis for $C_{10}Cl_2No.HCl$:
Calc.: C, 44.39; H, 5.22; N, 5.18;
Found: C, 44.35; H, 5.26; N, 5.20.

EXAMPLE 10

2-Aminomethyl-4,6-dichloro-3,5-diethoxyphenol Hydrochloride

Step A: 4-Chloro-3,5-diethoxyphenol Hydrochloride 3,5-Diethoxyphenol (20.59 g., 0.113 mole) is dissolved in chloroform (100 ml.) and freshly distilled sulfuryl chloride (15.3 g., 0.113 mole) in chloroform (50 ml.) is added dropwise with stirring at 20°–25°C. and the mixture then is stored at 20°–25°C. for 42 hours. Evaporation of the chloroform leaves a brown oil which is steam distilled to remove the 2-chloro isomer. Five liters of steam distillate is collected. The pot residue is cooled and the white solid formed is collected, dried and recrystallized from a mixture of benzene and hexane (2:1) to afford 4-chloro-3,5-diethoxyphenol hydrochloride, m.p. 107.5°–109°C.

Elemental analysis for $C_{10}H_{13}ClO_3$:
Calc.: C, 55.43; H, 6.05;
Found: C, 55.61; H, 6.00.

Step B: 2,4-Dichloro-3,5-diethoxyphenol

4-Chloro-3,5-diethoxyphenol hydrochloride (8.4 g., 0.039 mole) is dissolved in chloroform (100 ml.) and the mixture is heated to boiling. Sulfuryl chloride (freshly distilled) (5.4 g., 0.04 mole) in chloroform (10 ml.) is then added dropwise during 10 minutes. The heat of reaction keeps the reaction mixture boiling during the addition. The mixture is then refluxed for an additional 10 minutes and kept at 20°–25°C. for 40 hours. The chloroform is evaporated and the residue is recrystallized from low boiling petroleum ether to obtain 5.03 g. of 2,4-dichloro-3,5-diethoxyphenol, m.p. 61°–62°C.

Elemental analaysis for $C_{10}H_2Cl_2O_3$:

Calc.: C, 47.83; H, 4.52;

Found: C, 47.86; H, 4.82.

Step C: 2-Aminomethyl-4,6-dichloro-3,5-diethoxyphenol Hydrochloride

By following substantially the procedure described in Example 4 and by substituting 2,4-dichloro-3,5-diethoxyphenol for the 2,4-dibromo-3,5-dimethylphenol described therein, there is obtained, after recrystallization from a mixture of ethanol and concentrated hydrochloric acid (6:1), 0.53 g. of 2-aminomethyl-4,6-dichloro-3,5-diethoxyphenol hydrochloride, m.p. 195°–196.5°C.

Elemental analysis for $C_{11}H_{15}NO_3.HCl$:

Calc.: C, 41.73; H, 5.09; N, 4.42;

Found: C, 41.81; H, 5.05; N, 4.10.

EXAMPLE 11

2-Aminomethyl-6-bromo-4-chloro-3,5-dimethoxyphenol Hydrochloride

Step A: 2-Bromo-4-chloro-3,5-dimethoxyphenol

Bromine (7.99 g., 0.05 mole) in chloroform (25 ml.) is added rapidly to a stirred solution of 4-chloro-3,5-dimethoxyphenol (9.43 g., 0.05 mole) and chloroform (150 ml.) at about 20°C. The bromine is taken up immediately on addition. Stirring is continued for one-half hour then the chloroform is removed to afford a brown oil which is distilled at 132°–135°C./0.1 mm. to obtain 2-bromo-4-chloro-3,5-dimethoxyphenol. This colorless, viscous oil solidifies and is recrystallized from benzene-hexane to afford 2.58 g. of substantially pure 2-bromo-4-chloro-3,5-dimethoxyphenol, m.p. 64°–65°C.

Elemental analysis for $C_8H_8BrClO_3$:

Calc.: C, 35.92; H, 3.01;

Found: C, 36.14; H, 3.05.

Step B: 2-Aminomethyl-6-bromo-4-chloro-3,5-dimethoxyphenol Hydrochloride

A well-pulverized mixture of 2-bromo-4-chloro-3,5-dimethoxyphenol (2.58 g., 0.097 mole) and 2-chloro-N-hydroxymethylacetamide (1.19 g., 0.097 mole) is added portionwise at 20°C. to a stirred mixture of glacial acetic acid (25 ml.) and concentrated sulfuric acid (2.5 ml.) over a 10-minute period. The mixture is stirred for 3 hours and then poured into ice and water. The 2-chloro-N-(3-bromo-5-chloro-4,6-dimethoxybenzyl)acetamide that separates is stirred with fresh ice water but does not solidify. The crude gum is dissolved in absolute ethanol (20 ml.) and refluxed with concentrated hydrochloric acid (15 ml.) for 3½ hours, then evaporated to dryness. The residue is triturated with ether, then recrystallized from a mixture of isopropyl alcohol and ether to obtain 0.6 g. of 2-aminomethyl-6-bromo-4-chloro-3,5-dimethoxyphenol hydrochloride, m.p. 155°–156°C.

Elemental analysis for $C_9H_{11}BrClNO_3.HCl$:

Calc.: C, 32.46; H, 3.63; N, 4.21;

Found: C, 32.15; H, 3.81; N, 4.07.

By substituting for the 2-chloro-N-hydroxymethylacetamide of Example 11, Step B, an equimolar quantity of N-hydroxymethylurea, N-hydroxymethylbenzamide, N-hydroxymethylsalicylamide, N-hydroxymethyltrichloroacetamide or N-hydroxymethylformamide and by following substantially the procedure described therein, there is obtained N-(3-bromo-5-chloro-2-hydroxy-4,6-dimethoxybenzyl)urea, N-(3-bromo-5-chloro-2-hydroxy-4,6-dimethoxybenzyl)benzamide, N-(3-bromo-5-chloro-2-hydroxy-4,6-dimethoxybenzyl)salicylamide, N-(3-bromo-5-chloro-2-hydroxy-4,6-dimethoxybenzyl)trichloroacetamide and N-(3-bromo-5-chloro-2-hydroxy-4,6-dimethoxybenzyl)formamide, respectively, which compounds upon treatment with concentrated hydrochloric acid afford 2-aminomethyl-6-bromo-4-chloro-3,5-dimethoxyphenol hydrochloride.

EXAMPLE 12

2-Aminomethyl-4-chloro-6-iodo-3,5-dimethylphenol Hydrochloride

A well-pulverized mixture of 4-chloro-2-iodo-3,5-dimethylphenol (3.10 g., 0.011 mole) and 2-chloro-N-hydroxymethylacetamide (1.35 g., 0.011 mole) is added portionwise at 20°C. to a stirred mixture of glacial acetic acid (25 ml.) and concentrated sulfuric acid (2.5 ml.) over a 10-minute period. The mixture is stirred for 3 hours and then poured into ice and water to afford crude 2-chloro-N-(5-chloro-2-hydroxy-3-iodo-4,6-dimethylbenzyl)acetamide which is dissolved in absolute ethanol (30 ml.). Concentrated hydrochloric acid (15 ml.) is added and the solution is refluxed for 3 hours, then evaporated to dryness. The residue is triturated with ether and the solid obtained is recrystallized from a mixture of isopropyl alcohol and ether to afford 2-aminomethyl-4-chloro-6-iodo-3,5-dimethylphenol hydrochloride.

By substituting for the 4-chloro-2-iodo-3,5-dimethylphenol of Example 12 an equimolar quantity of 2-chloro-4-iodo-3,5-dimethylphenol or 4-bromo-2-iodo-3,5-dimethylphenol and following substantially the procedure described therein, there is obtained, respectively, 2-chloro-N-(3-chloro-2-hydroxy-5-iodo-4,6-dimethylbenzyl)acetamide and 2-chloro-N-(5-bromo-2-hydroxy-3-iodo-4,6-dimethylbenzyl)acetamide which upon treatment with concentrated hydrochloric acid afford, respectively, 2-aminomethyl-6-chloro-4-iodo-3,5-dimethylphenol hydrochloride and 2-aminomethyl-4-bromo-6-iodo-3,5-dimethylphenol hydrochloride.

EXAMPLE 13

2-Aminomethyl-4,6-dichloro-3,5-dimethoxyphenol
and
2-Aminomethyl-4,6-dichloro-3,5-dimethoxyphenol Hydrochloride Step A: 3,5Dichloro-4,6-dimethoxysalicylaldehyde Sulfuryl chloride (80.0 g., 0.593 mole) in chloroform (50 ml.) is added dropwise over a 1-hour period to a refluxing solution of freshly distilled 4,6-dimethoxysalicylaldehyde (44.9 g., 0.247 mole) in chloroform (200 ml.). After one-half of the sulfuryl chloride solution is added a solid precipitates which redissolves on further addition of the sulfuryl chloride solution. The reaction mixture is refluxed for five hours. Additional sulfuryl chloride (3.33 g.) is added and the mixture is refluxed for an additional hour and then stirred at 20°–25°C. for 16 hours. The chloroform is evaporated and the gummy solid residue is moistened with low-boiling petroleum ether. Upon trituration, solid 3,5-dichloro-4,6-dimethoxysalicylaldehyde (49.6 g., m.p. 105°-116°C.) forms. A sample for analysis is recrystallized successively from a mixture of acetic acid and water (3:1) and from a mixture of ethanol and water (3:2) and then sublimed at 100°C. (0.1 mm.) to obtain 3,5-dichloro-4,6-dimethoxysalicylaldehyde as a pale yellow solid, m.p. 121°-123°C.

Elemental analysis for $C_9H_8Cl_2O_4$:
Calc.: C, 43.06; H, 3.21;
Found: C, 43.19; H, 3.07.

Step B: 3,5-Dichloro-4,6-dimethoxysalicylaldoxime 3,5-Dichloro-4,6-dimethoxysalicylaldehyde (49.6 g., 0.198 mole) is dissolved in boiling ethanol (500 ml.) in a one liter round bottomed flask equipped with a reflux condenser, dropping funnel and stirrer. To the refluxing stirred solution is added portionwise a solution of hydroxylamine hydrochloride (27.5 g., 0.396 mole) and sodium acetate trihydrate (53.8 g., 0.396 mole) in water (100 ml.). A precipitate forms and additional water (25 ml.) is added to redissolve it. The mixture is refluxed for 2 hours. Then about 2 g. of decolorizing carbon is added and the mixture is refluxed for another ½ hour, filtered free of the carbon and the ethanol distilled until the solution becomes cloudy. The solution is poured into water (300 ml.) to precipitate 3,5-dichloro-4,6-dimethoxysalicylaldoxime as a beige solid which is collected and dried in air. The crude product is recrystallized from a mixture of ethanol and water (3:2) to obtain 27.1 g. of 3,5-dichloro-4,6-dimethoxysalicylaldoxime, m.p. 171°-174°C. For analysis a sample is recrystallized 3 more times from a mixture of ethanol and ether (3:2) to obtain the product as a pale yellow solid, m.p. 173°-175°C.

Elemental anllysis for $C_9H_9Cl_2NO_4$:
Calc.: C, 40.63; H, 3.41; N, 5.26;
Found: C, 40.77; H, 3.44; N, 5.15.

Step C: 2-Aminomethyl-4,6-dichloro-3,5-dimethoxyphenol 3,5-Dichloro-4,6-dimethoxysalicylaldoxime (39.8 g., 0.15 mole) is dissolved in a mixture of absolute ethanol (500 ml.) and concentrated sulfuric acid (40 ml.) and hydrogenated over rhodium on carbon (5%, 3 g.) at an initial pressure of about 40 p.s.i. After 2 hours no further drop in pressure is noted. The reaction mixture is filtered through infusorial earth and the filtrate evaporated to dryness under reduced pressure to afford 2-aminomethyl-4,6-dichloro-3,5-dimethoxyphenol hydrosulfate as a pale yellow oil which soon solidifies to a mass of tiny colorless needles. This solid is dissolved in water (600 ml.), the solution is filtered and made basic with a 28% ammonium hydroxide solution to yield 2-aminomethyl-4,6-dichloro-3,5-dimethoxyphenol as a cream colored powder which is digested with two 250 ml. portions of absolute ethanol to obtain 34.4 g. of 2-aminomethyl-4,6-dichloro-3,5-dimethoxyphenol as a white powder. A small sample is recrystallized from ethanol for analysis, m.p. 165°-166°C.

Elemental analysis for $C_9H_{11}Cl_2NO_3$:
Calc.: C, 42.88, H, 4.40; N, 5.56;
Found: C, 42.99; H, 4.39; N, 5.58.

Step D: 2-Aminomethyl-4,6-dichloro-3,5-dimethoxyphenol Hydrochloride

2-Aminomethyl-4,6-dichloro-3,5-dimethoxyphenol (34.4 g.) is suspended in absolute ethanol (150 ml.) and the mixture is stirred and heated on a steam bath. A saturated ethanol solution of hydrochloric acid (30 ml.) is added until the solid dissolved. The hot solution is filtered, the filtrate is cooled and anhydrous ether (1.5 l.) is added. The mixture is kept at about 5°C. until precipitation is complete. The solid is collected and dried under reduced pressure over phosphorous pentoxide for 3 hours to afford 32.5 g. of 2-aminomethyl-4,6-dichloro-3,5-dimethoxyphenol hydrochloride, m.p. 174°-175°C.

By substituting for the 4,6-dimethoxysalicylaldehyde of Example 13, Step A, an equimolar quantity of 4,6-dimethylsalicylaldehyde and following substantially the procedure described therein there is obtained 3,5-dichloro-4,6-dimethylsalicylaldehyde which when substituted for the 3,5-dichloro-4,6-dimethoxysalicylaldehyde of Example 13, Step B, and by following substantially the procedure described therein, affords 3,5-dichloro-4,6-dimethylsalicylaldoxime which compound, by following substantially the procedure described in Example 13, Step C, is converted to 2-aminomethyl-4,6-dichloro-3,5-dimethylphenol which, if desired, may be converted, by the procedure of Example 13, Step D, to 2-aminomethyl-4,6-dichloro-3,5-dimethylphenol hydrochloride.

The novel compounds of this invention are diuretic and saluretic agents which can be administered in a wide variety of therapeutic dosages in conventional vehicles as, for example, by oral administration in the form of a tablet or by intravenous injection. Also, the daily dosage of the products may be varied over a wide range varying from 5 to 2,000 mg. The product is preferably administered in subdivided doses in the form of scored tablets containing 5, 10 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of a substituted 2-aminomethyl-4,6-dihalophenol (I) or a suitable salt thereof, with 149 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known diuretics and saluretics or with other desired therapeutic and/or nutritive agents in dosage unit form.

The following example is included to illustrate the preparation of a representative dosage form:

EXAMPLE 14

Dry-filled capsules containing 50 mg. of active ingredient per capsule

|  | Per Capsule |
|---|---|
| 2-Aminomethyl-4,6-Dichloro-3,5-Dimethoxyphenol Hydrochloride | 50 mg. |
| Lactose | 149 mg. |
| Magnesium Stearate | 1 mg. |
| Capsule (Size No. 1) | 200 mg. |

The 2-aminomethyl-4,6-dichloro-3,5-dimethoxyphenol hydrochloride is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the substituted 2-aminomethyl-4,6-dihalophenols (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

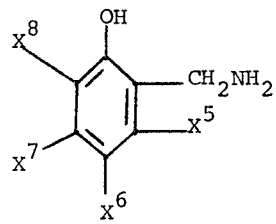

wherein:
  $X^5$ is methyl, ethyl or methoxy;
  $X^7$ is methyl, ethyl or methoxy; and
  $X^6$ and $X^8$ are chloro, bromo, iodo or fluoro and the non-toxic pharmaceutically acceptable salts thereof.

2. A compound according to claim 1 wherein $X^5$ and $X^7$ are methoxy and $X^6$ and $X^8$ are chloro.

3. A compound according to claim 1 wherein $X^5$ is methyl; $X^6$ is chloro; $X^7$ is ethyl and $X^8$ is chloro.

4. A compound according to claim 1 wherein $X^5$ and $X^7$ are methyl and $X^6$ and $X^8$ are chloro.

* * * * *